Figure 1:
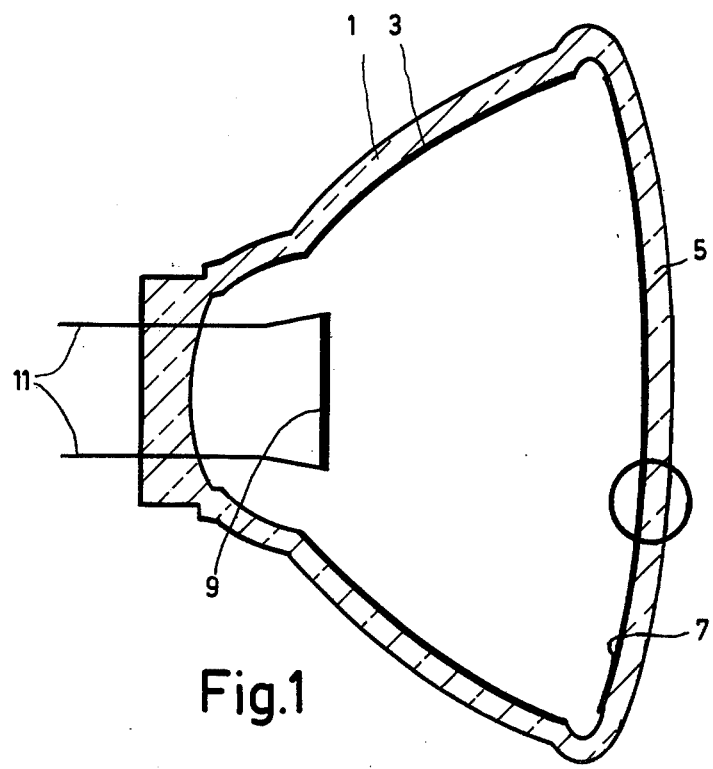

United States Patent [19]

Köstlin et al.

[11] 4,127,789
[45] Nov. 28, 1978

[54] LIGHT-PERVIOUS, HEAT-REFLECTING FILTER AND ELECTRIC LAMPS HAVING SUCH A FILTER

[75] Inventors: Heiner Köstlin; Rüdiger Jost; Hans Auding, all of Aachen, Fed. Rep. of Germany

[73] Assignee: U.S. Philips Corporation, New York, N.Y.

[21] Appl. No.: 846,213

[22] Filed: Oct. 27, 1977

[30] Foreign Application Priority Data

Oct. 28, 1976 [DE] Fed. Rep. of Germany ....... 2648878

[51] Int. Cl.² .......................... G02B 1/10; H01J 5/10; H01J 61/40; H01K 1/26
[52] U.S. Cl. ..................................... 313/112; 350/1.6; 350/311; 427/166; 427/344; 427/377
[58] Field of Search ................. 313/112–115; 350/1.1, 1.6, 311; 427/107, 166, 168, 344, 377; 428/426, 428

[56] References Cited

U.S. PATENT DOCUMENTS

| 3,666,534 | 5/1972 | Groth et al. ...................... 313/112 X |
| 3,949,259 | 4/1976 | Köstlin et al. .................... 350/1.6 X |
| 4,017,758 | 4/1977 | Almer et al. ........................ 313/112 |

*Primary Examiner*—Siegfried H. Grimm
*Attorney, Agent, or Firm*—Robert S. Smith

[57] ABSTRACT

The life of light-pervious, thermal radiation-reflecting filters of tin-doped indium oxide is drastically elongated when used in oxidizing or reducing medium by coating the indium oxide layer with pyrolytic or hydrolytic silicon dioxide.

2 Claims, 3 Drawing Figures

U.S. Patent   Nov. 28, 1978   Sheet 1 of 2   4,127,789

LIGHT-PERVIOUS, HEAT-REFLECTING FILTER AND ELECTRIC LAMPS HAVING SUCH A FILTER

The invention relates to a light-pervious, thermal radiation-reflecting filter, having a light-pervious substrate coated with tin-doped indium oxide, and to electric lamps having such a filter.

Such a filter is disclosed inter alia in U.S. Pat. No. 3,949,259. It may be used inter alia as window pane glass, as a lamp envelope for discharge lamps, such as low pressure sodium vapour discharge lamps; in combination with incandescent lamps, for example, as a lamp envelope or as a face plate in reflector lamps.

Tin-doped indium oxide has the favourable property of considerably reflecting the thermal radiation, while nevertheless it has a very high transmission for visible radiation.

However, dependent on the conditions in which the filter is used — the atmosphere in which it is present, the amount of energy which is incident on the filter-discoloration occurs in the course of time and the heat-reflecting and light-pervious capacity of the filter varies. When the filter is used in lamps, in which it is in a vacuum or in contact with rare gas and/or nitrogen, first brown coloration and then blackening occurs in the case of too high loads, after which the filter obtains a metallic appearance, until, after evaporation of the coating, only the substrate remains. When the filter is used in air at too high a load it loses completely its heat-reflecting capacity in the long run without intermediate dart colouring.

It is the object of the invention to provide a filter which has a longer life also when it assumes a higher temperature under the influence of the incident radiation.

In agreement herewith the invention relates to a light-pervious, thermal radiation-reflecting filter of the kind mentioned in the preamble which is characterized in that on its side remote from the substrate it is coated with silicon dioxide selected from the group consisting of hydrolytic silicon dioxide and pyrolytic silicon dioxide.

It has surprisingly been found that the life of a filter according to the invention, in circumstances in which it is heavily loaded, can increase by more than a factor 1000.

The invention is based on the recognition of the fact that the variations which can occur in the known filter during operation are the result of loss of oxygen or absorption of oxygen in accordance with the fact whether the atmosphere is poor or rich in oxygen This could be prevented by coating the filter with a material which is not permeable to oxygen. However, it should be possible to provide said material in circumstances in which the filter maintains its correct oxygen content, that is to say, circumstances in which the indium is fully oxidized to indium oxide and the tin is present in the indium oxide in the elementary form. Furthermore, the coating material should be light-pervious.

It has now been found that coating layers which are impermeable to oxygen cannot be manufactured by silicon dioxide deposition achieved by evaporating silicon monoxide in an oxygen-containing atmosphere. Thus, when a filter is coated with such a layer, the same phenomena occur during operation as in a non-coated filter.

It has surprisingly been found that silicon dioxide layers obtained by pyrolysis or hydrolysis of a silicon compound sufficiently protect the filter in operating condition, that is to say in oxidizing or reducing medium at temperatures up to approximately 300° C., while on the other hand such layers permit of adjusting the correct oxygen content in the filter at higher temperatures. This is not only of advantage because in the manufacture of the coating layers in the filter the correct oxygen content cannot be obtained or cannot be maintained, but also because the filter sometimes has to be assembled by means of a high-temperature process. This is the case, for example, when the filter is used as a face plate of a reflector lamp.

In manufacturing the filters according to the invention the starting material is a substrate which is coated with tin-doped indium oxide. As a rule the indium oxide layer has a thickness of 0.08 to 0.5 $\mu$m. The tin-doped indium oxide layer is then contacted at elevated temperature with a gas mixture containing a hydrolysable or pyrolisable silicon compound. After the formation of the silicon dioxide layer, the filter is reduced at a temperature of at least 400° C., preferably approximately 500° C., by contacting it with a gas atmosphere whose partial oxygen pressure is less than $10^{-7}$ atmospheres and preferably is between $10^{-7}$ atmospheres and the equilibrium pressure of indium oxide. For this purpose the coated filter can be contacted with $CO, H_2$ or $CO$ and $H_2$ with a partial pressure of up to 100 Torr. Alternatively, a mixture of $CO$ and $CO_2$ or of $H_2$ and $H_2O$ may be used. The reactive gas may be mixed with an inert gas, for example argon or nitrogen. As a rule the reaction duration is from a few tens of seconds to a few tens of minutes.

Generally the resulting coated filters have a tin content of 7 to 20 at% calculated on the quantity of indium. Their free electron density generally is between $10^{21}$ and $3 \times 10^{21}$ electrons/cm$^3$.

In manufacturing a pyrolytic silicon dioxide layer, a mixture of inert gas, oxygen and pyrolysable silicon compound is contacted with the filter which has a temperature of approximately 400° C. or higher. The inert gas may be nitrogen or argon or mixtures thereof. Alternatively, air may constitute the mixture of inert gas and oxygen. As a silicon compound is added to the gas mixture, for example, $SiH_4$ in a quantity of 0.5–3% by volume. The reaction is continued until a silicon dioxide layer is formed of the desired thickness, for example 0.05–0.3 $\mu$m.

In the manufacture of a hydrolytic silicon dioxide layer the filter is contacted with a hydrolysable silicon compound, for example $SiCl_4$, and water vapour. Preferably, alternatingly $SiCl_4$ in a dry inert gas, for example nitrogen or argon, for example in a quantity of 0.01–1% by volume, and water vapour, for example in the form of air having a relative humidity of 30–65%, are contacted with the filter. The hydrolysis runs off rapidly already at room temperature. It is recommendable to dry the silicon dioxide layer prior to reducing the filter by gradually increasing the temperature, for example, in 5 minutes to 200° C.

The filters according to the invention are suitable in particular for use in electric lamps, for example incandescent lamps and discharge lamps. When used in discharge lamps, it is endeavoured to restrict the heat loss of the lamps and hence increase their efficiency. When used in incandescent lamps restriction of heat loss can also be endeavoured but also the reduction of the thermal load of the objects to be illuminated.

Therefore the invention also relates to electric lamp having a light-pervious lamp envelope in which an electric element is arranged, having current supply wires to the electric element which are passed in a vacuum-tight manner through the wall of the lamp envelope, the lamp envelope having a tin-doped indium oxide layer, characterized in that the tin-doped indium oxide layer is coated with silicon dioxide selected from the group consisting of hydrolytic silicon dioxide and pyrolytic silicon dioxide.

In such lamps the indium oxide layer will generally be present on the inner wall of the lamp envelope. In an incandescent lamp, the said electric element of the lamp is the filament, in a gas discharge lamp it is the discharge vessel with electrode pair and gas filling.

Figure 2:
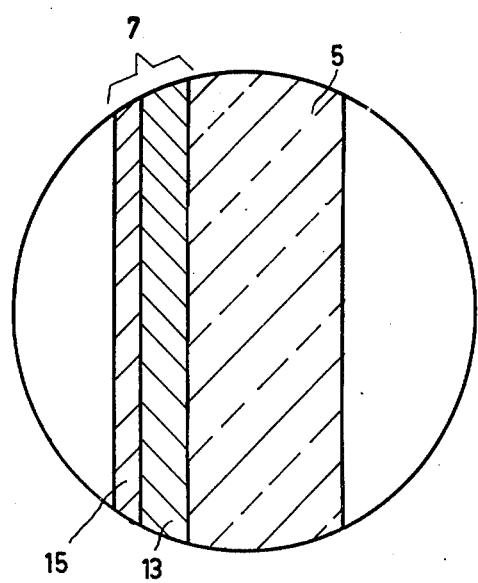
Figure 3:
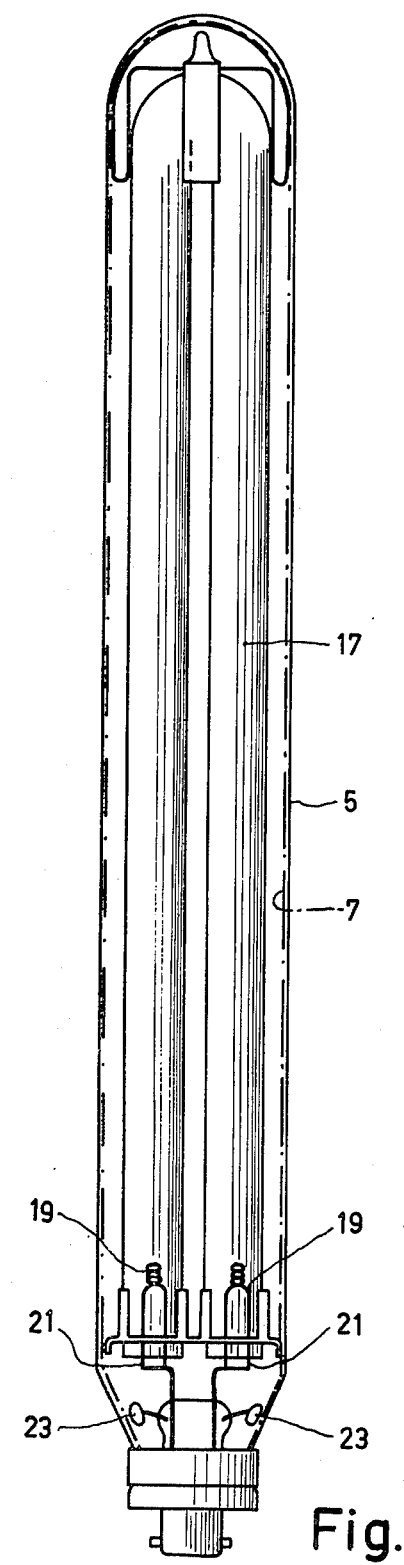

In order that the invention may be readily carried into effect, embodiments thereof will now be described in greater detail with reference to the drawings, in which FIG. 1 is a sectional view through an incandescent lamp, FIG. 2 is a detail on an enlarged scale of FIG. 1, also a sectional view through a filter according to the invention, FIG. 3 is an elevation of a discharge lamp.

In FIG. 1 a conical part 1 of the lamp envelope is covered with an aluminium mirror 3. The face plate 5 is provided on its inside with an indium oxide layer 7 which is covered with pyrolytic silicon oxide and is doped with tin. The filament whose current supply wires 11 extend through the wall of the lamp envelope in a vacuum-tight manner is referenced 9.

Reference numeral 5 in FIG. 2 denotes the glass face plate of the lamp envelope and reference numeral 13 denotes the tin-doped indium oxide layer which is coated by a layer 15 of pyrolytic silicon oxide.

In FIG. 3 the lamp envelope 5 is provided on its inside with a tin-doped indium oxide layer on which a pyrolytic silicon oxide layer is provided. Both layers together are denoted by 7. (FIG. 2 is a cross-sectional view on an enlarged scale of a detail). A discharge vessel 17 having electrodes 19 and current supply conductors 21 are present in the lamp envelope. Gettering rings 23 are also provided in the lamp envelope.

EXAMPLE 1

A glass plate was coated on one side with a 0.3 μm thick indium oxide layer doped with tin. The layer was obtained by nebulizing a solution of 100 g of $InCl_3$ and 4 $cm^3$ of $SnCl_4$ in 1 l of n.butyl acetate with oxygen on the plate which was heated at 500° C.

A gas was blown on the indium oxide layer which had a temperature of 500° C., at a rate of 5 m/sec. The gas was argon to which 2% by volume of $SiH_4$, 30% by volume of nitrogen and 20% by volume of oxygen had been added. After the formation of a silicon oxide layer of 0.2 μm thickness the reaction was terminated.

CO at a pressure of 15 Torr was then passed over the coated plate, which had the same temperature. A filter was obtained having a free electron density of $1.3 \times 10^{21} / cm^3$.

EXAMPLE 2

Starting from the same coated glass plate, a filter was obtained by alternatingly leading over the doped indium oxide layer a gas flow of argon of 0.1% by volume $SiH_4$ and air with a relative humidity of 60% at room temperature at a rate of 2 m/sec and reducing the resulting product. For that purpose, the product was heated to 200° C. in 5 minutes after which the temperature was further increased to 500° C. A gas flow of nitrogen with 8% by volume of hydrogen was then led over the coated indium oxide layer, a filter of the same properties as in example 1 being obtained.

When said filter is used in a reflector lamp the thermal load of illuminated objects was reduced by more than 70%. Both in reflector lamps of 100 W and of 150 W, no change of the filter could be observed after 1000 hours in operation, whereas a filter without the silicon oxide coating layer showed a significant discoloration already after 1 hour in operation.

What is claimed is:

1. A light-pervious, thermal radiation-reflecting filter having a light-pervious substrate coated with tin-doped indium oxide, characterized in that on its side remote from the substrate the filter is coated with silicon dioxide selected from the group consisting of hydrolytic silicon dioxide and pyrolytic silicon dioxide.

2. An electric lamp having a light-pervious lamp envelope in which an electric element is arranged, having current supply wires to the electric element which are passed in a vacuum-tight manner through the wall of the lamp envelope, the lamp envelope having a tin-doped indium oxide layer, characterized in that the tin-doped indium oxide layer is coated with silicon dioxide selected from the group consisting of hydrolytic silicon dioxide and pyrolytic silicon dioxide.

* * * * *